United States Patent
Tsai

(10) Patent No.: US 8,341,319 B2
(45) Date of Patent: Dec. 25, 2012

(54) EMBEDDED SYSTEM AND METHOD FOR CONTROLLING ELECTRONIC DEVICES USING THE EMBEDDED SYSTEM

(75) Inventor: Ying-Chuan Tsai, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/159,371

(22) Filed: Jun. 13, 2011

(65) Prior Publication Data

US 2012/0096187 A1    Apr. 19, 2012

(30) Foreign Application Priority Data

Oct. 15, 2010    (TW) ................................ 99135343 A

(51) Int. Cl.
*G06F 3/00* (2006.01)

(52) U.S. Cl. ................................ 710/104; 713/1; 713/2

(58) Field of Classification Search .......... 710/5, 14–19, 710/72, 104; 717/168; 713/1, 2
See application file for complete search history.

(56) References Cited

U.S. PATENT DOCUMENTS

| 7,447,897 B2* | 11/2008 | Cheng | 713/2 |
| 2006/0259902 A1* | 11/2006 | Lin | 717/168 |
| 2011/0225499 A1* | 9/2011 | Lu | 715/735 |

* cited by examiner

*Primary Examiner* — Tammara Peyton
(74) *Attorney, Agent, or Firm* — Altis Law Group, Inc.

(57) ABSTRACT

An embedded system acquires hardware device information of an electronic device via a universal serial bus (USB) port, sets parameter information for each hardware device of the electronic device, and generates a control file recording one or more control commands that are generated according to the parameter information. The control file is sent to the electronic device by the embedded system via the USB port, and executed by the electronic device, to control one or more hardware device of the electronic device according to the one or more commands.

12 Claims, 3 Drawing Sheets

EMBEDDED SYSTEM AND METHOD FOR CONTROLLING ELECTRONIC DEVICES USING THE EMBEDDED SYSTEM

BACKGROUND

1. Technical Field

Embodiments of the present disclosure relate to systems and methods for controlling electronic devices, and more particularly, to an embedded system and a method for controlling electronic devices using the embedded system.

2. Description of related art

An operating system (OS), such as WINDOWS or LINUX, allows users to install desired third-party programs, so that design engineers may develop and install device drivers in the OS to control other electronic devices. However, a more enclosed OS prohibits the installation of any third-party programs, so that device drivers cannot be installed in the enclosed OS to control electronic devices.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
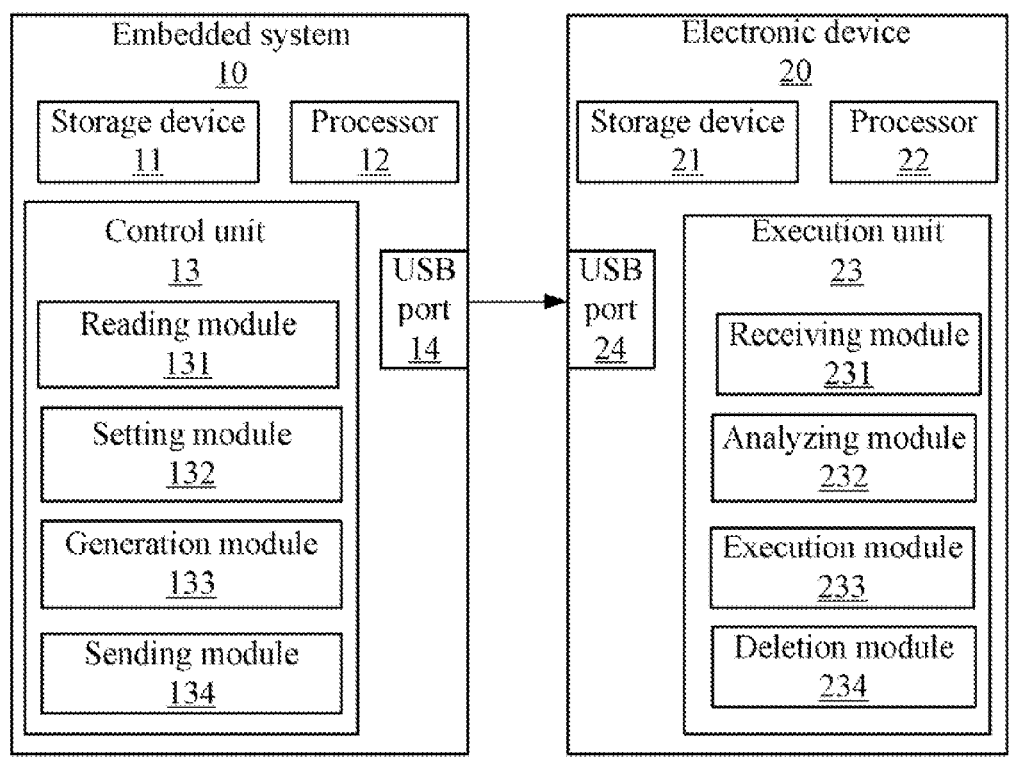
FIG. 1 is a block diagram of one embodiment of function modules of an embedded system.
Figure 2:
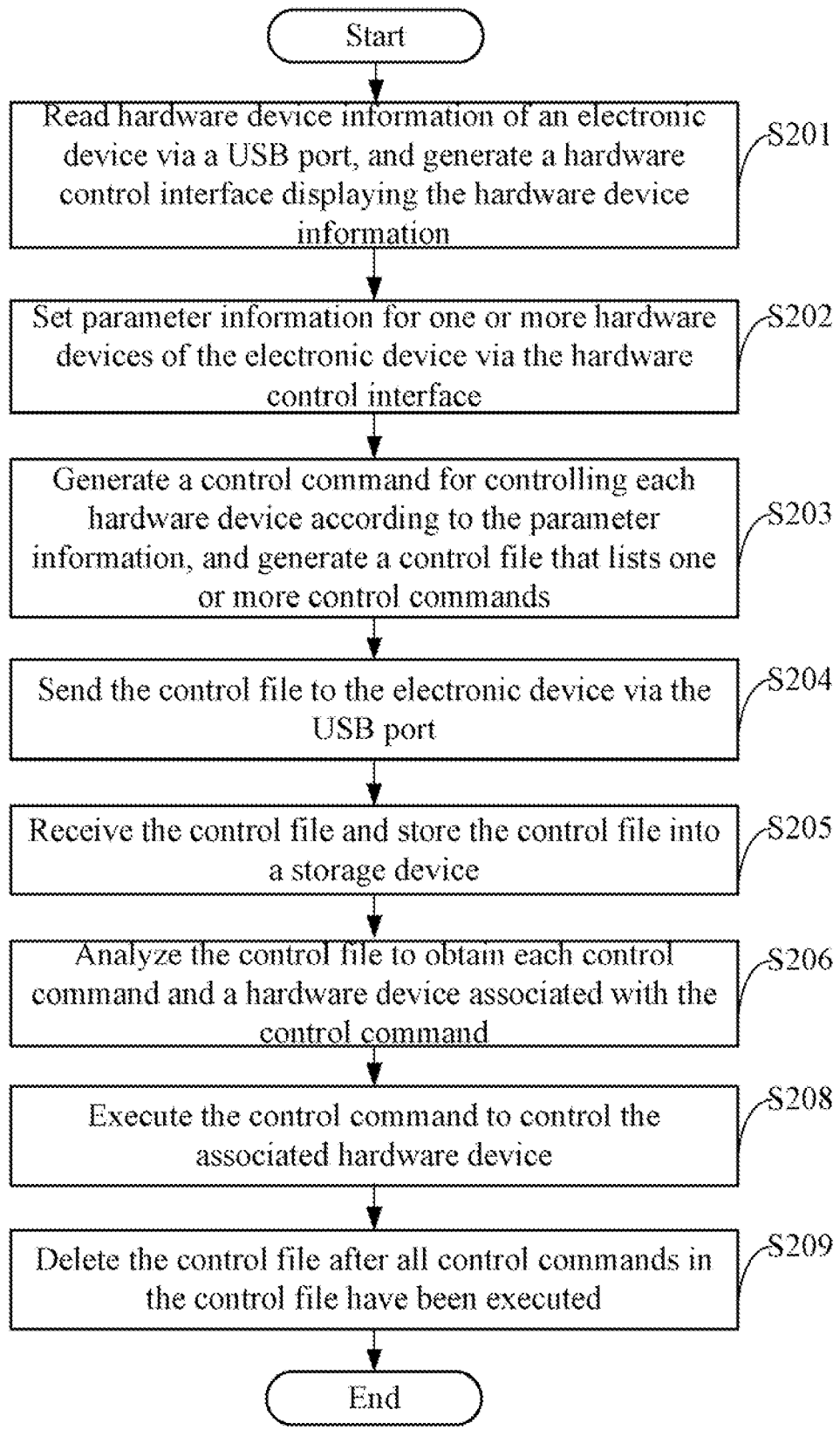
FIG. 2 is a block diagram of one embodiment of a method for controlling electronic devices using the embedded system in FIG. 1.

FIG. 1 is a block diagram of one embodiment of function modules of an embedded system 10. The embedded system 10 includes a storage device 11, a processor 12, a control unit 13, and one or more universal serial bus (USB) ports 14 (only one shown). In one embodiment, the embedded system 10 is connected to one or more electronic devices 20 via the one or more USB ports 14. The control unit 13 generates a control file that lists control commands to be used in an electronic device 20 to control hardware devices of the electronic device 20, and sends the control file to the electronic device 20 via the USB port 14. The electronic device 20 receives the control file, analyzes and retrieves the control commands, and executes the control commands to control the hardware devices.

In one embodiment, the control unit 13 includes a reading module 131, a setting module 132, a generation module 133, and a sending module 134. The modules 131-134 may comprise computerized code in the form of one or more programs that are stored in the storage device 11. The computerized code includes instructions that are executed by the processor 12 to provide the below described functions of the modules 131-134.

The reading module 131 is operable to read hardware device information of the electronic device 20 via the USB port 14, and generate a hardware control interface 30 displaying the hardware device information. In one embodiment, the hardware device information may include names of one or more hardware devices of the electronic device 20, and performance parameters of each hardware device. For example, the electronic device 20 may includes hardware devices such as a fan, a power supply, a video card, and so on. The performance parameters of the fan may include a fan power state and a fan speed.

Figure 3:
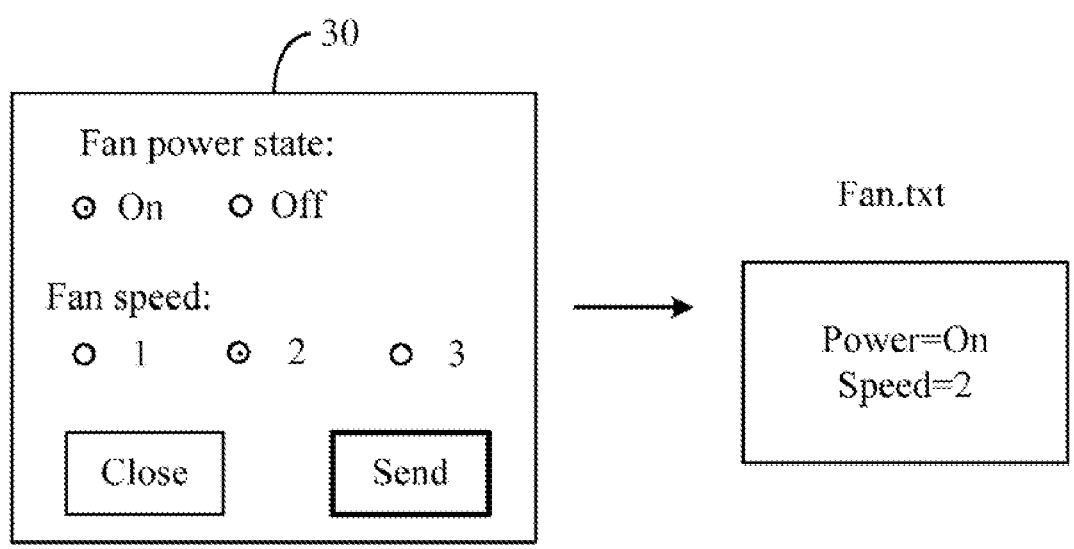
FIG. 3 is an example for setting parameters on a hardware control interface to control the fan of an electronic device and generating a control file.

The setting module 132 is operable to set parameter information for the one or more hardware devices of the electronic device 10 via the hardware control interface 30. For example, as shown in FIG. 3, the hardware control interface 30 displays performance parameters of the fan, such as the fan power state and the fan speed. The setting module 132 may set the fan power state to be "on" or "off". If the fan power state is set to be "on", the setting module 132 may further set the fan speed to at a "first level", a "second level", or a "third level". The setting module 132 may set parameter information for all hardware devices at the same time, or only set parameter information for one hardware device at one time.

The generation module 133 is operable to generate a control command for the control of each hardware device according to the parameter information, and generate a control file that lists one or more control commands. For example, if the setting module 132 only sets parameter information for the fan, as shown in FIG. 3, the generation module 133 may generate a control file titled "Fan.txt" which comprises commands of setting the fan power state to be "on" and setting the fan speed at the "second level".

The sending module 134 is operable to send the control file to the electronic device 20 via the USB port 14.

In one embodiment, the electronic device 20 may include a storage device 21, a processor 22, an execution unit 23, and a USB port 24. The execution unit 23 includes a receiving module 231, an analyzing module 232, an execution module 233, and a deletion module 234. The modules 231-234 may comprise computerized code in the form of one or more programs that are stored in the storage device 21. The computerized code includes instructions that are executed by the processor 22 to provide the below described functions of the modules 231-234.

The receiving module 231 is operable to receive the control file sent from the embedded system 10 via the USB port 24.

The analyzing module 232 is operable to analyze the control file to obtain each control command and a hardware device associated with the control command. For example, the analyzing module 232 analyzes the control file "Fan.txt" to retrieve the control commands to switch the fan as "on" and set the fan speed at the "second level".

The execution module 233 is operable to execute the control command to control the associated hardware device. For example, the execution module 233 executes the control command to switch the fan on and switch the fan speed at the second level.

The deletion module 234 is operable to delete the control file after all control commands in the control file have been executed. For example, the deletion module 234 may delete the control file "Fan.txt".

FIG. 3 is a flowchart of one embodiment of a method for controlling the electronic device 20 using the embedded system 10. Depending on the embodiment, additional blocks may be added, others removed, and the ordering of the blocks may be changed.

In block S201, the reading module 131 reads hardware device information of an electronic device 20 via a USB port 14, and generates a hardware control interface 30 displaying the hardware device information. As mentioned above, the hardware device information may include names of one or more hardware devices of the electronic device 20, and performance parameters of each hardware device. For example, the electronic device 20 may includes hardware devices such as a fan, a power supply, a video card, and so on. The performance parameters of the fan may include a fan power state and a fan speed.

In block S202, the setting module 132 sets parameter information for the one or more hardware devices of the electronic device 10 via the hardware control interface 30. For example, as shown in FIG. 3, the hardware control interface 30 displays performance parameters of the fan, such as the fan power state and the fan speed. Then, the setting module 132 sets the fan power state to be "on", and sets the fan speed to at a "second level".

In block S203, the generation module 133 generates a control command for the control of each hardware device according to the parameter information, and generates a control file that lists one or more control commands. For example, as shown in FIG. 3, the generation module 133 generates a control file named as "Fan.txt" which records the control command to switch the fan on and set speed to at the "second level".

In block S204, the sending module 134 sends the control file from the embedded system 10 to the electronic device 20 via the USB port 14.

In block S205, the receiving module 231 receives the control file sent from the embedded system 10 via the USB port 24, and stores the control file into the storage device 21.

In block S206, the analyzing module 232 analyzes the control file to obtain each control command and a hardware device associated with the control command. For example, the analyzing module 232 analyzes the control file "Fan.txt" to obtain the control commands to switch the fan "on" and set speed to at the "second level".

In block S207, the execution module 233 executes the control command. For example, the execution module 233 executes the control command to switch the fan on and set the fan speed at the "second level".

In block S208, the deletion module 234 deletes the control file from the storage device 21 after all control commands in the control file have been executed. For example, the deletion module 234 may delete the control file "Fan.txt".

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for controlling an electronic device using an embedded system, the embedded system connected with the electronic device via a universal serial bus (USB) port, the method comprising:

reading hardware device information of the electronic device via the USB port, and generating a hardware control interface displaying the hardware device information;

setting parameter information for one or more hardware devices of the electronic device via the hardware control interface;

generating a control command for the control of each hardware device according to the parameter information, and generating a control file that lists one or more control commands; and sending the control file to the electronic device via the USB port, and executing the one or more control commands in the electronic device to control associated one or more hardware devices.

2. The method of claim 1, before executing the one or more control commands further comprising:

receiving the control file sent from the embedded system via a USB port of the electronic device, and storing the control file into a storage device of the electronic device; and analyzing the control file to obtain each control command and a hardware device associated with the control command.

3. The method of claim 2, further comprising: deleting the control file from the storage device of the electronic device after all control commands in the control file have been executed.

4. The method of claim 1, wherein the hardware device information comprises names of the one or more hardware devices of the electronic device, and performance parameters of each hardware device.

5. An embedded system, comprising:

a first universal serial bus (USB) port;

a first storage device;

a first processor; and a control unit comprising computerized code in the form of one or more programs, which are stored in the first storage device and executable by the first processor, the one or more programs comprising:

a reading module operable to read hardware device information of an electronic device via the first USB port, and generate a hardware control interface displaying the hardware device information;

a setting module operable to set parameter information for one or more hardware devices of the electronic device via the hardware control interface;

a generating module operable to generate a control command for the control of each hardware device according to the parameter information, and generate a control file that lists one or more control commands; and a sending module operable to send the control file to the electronic device via the first USB port, wherein the control file is to be executed by the electronic device, so as to control corresponding one or more hardware devices of the electronic device.

6. The embedded system of claim 5, wherein the electronic device comprises:

a second USB port;

a second storage device;

a second processor; and an execution unit comprising computerized code in the form of one or more programs, which are stored in the second storage device and executable by the second processor, the one or more programs comprising:

a receiving module operable to receive the control file sent from the embedded system via the second USB port, and storing the control file into the second storage device;

an analyzing module operable to analyze the control file to obtain each control command and a hardware device associated with the control command; and an executing module operable to execute the control command to control the associated hardware device.

7. The embedded system of claim 5, wherein the execution unit further comprises a deletion module operable to delete the control file from the storage device of the electronic device after all control commands in the control file have been executed.

8. The embedded system of claim 5, wherein the hardware device information comprises names of the one or more hardware devices of the electronic device, and performance parameters of each hardware device.

9. A non-transitory computer readable medium storing a set of instructions, the set of instructions capable of being executed by processors to perform a method for controlling an electronic device using an embedded system, the embedded system connected with the electronic device via a universal serial bus (USB) port, the method comprising:

reading hardware device information of the electronic device via the USB port, and generating a hardware control interface displaying the hardware device information;

setting parameter information for one or more hardware devices of the electronic device via the hardware control interface;

generating a control command for the control of each hardware device according to the parameter information, and generating a control file that lists one or more control commands; and sending the control file to the electronic device via the USB port, and executing the one or more control commands in the electronic device to control associated one or more hardware devices.

10. The non-transitory computer readable medium of claim 9, wherein before executing the one or more control commands, the method further comprises:

receiving the control file sent from the embedded system via a USB port of the electronic device, and storing the control file into a storage device of the electronic device; and analyzing the control file to obtain each control command and a hardware device associated with the control command.

11. The non-transitory computer readable medium of claim 10, wherein the method further comprises: deleting the control file from the storage device of the electronic device after all control commands in the control file have been executed.

12. The non-transitory computer readable medium of claim 9, wherein the hardware device information comprises names of the one or more hardware devices of the electronic device, and performance parameters of each hardware device.

* * * * *